US006650332B2

(12) United States Patent
Doyle et al.

(10) Patent No.: US 6,650,332 B2
(45) Date of Patent: Nov. 18, 2003

(54) METHOD AND APPARATUS FOR IMPLEMENTING DYNAMIC DISPLAY MEMORY

(75) Inventors: Peter Doyle, El Dorado Hills, CA (US); Aditya Sreenivas, El Dorado Hills, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/993,217

(22) Filed: Nov. 5, 2001

(65) Prior Publication Data

US 2002/0075271 A1 Jun. 20, 2002

Related U.S. Application Data

(63) Continuation of application No. 09/231,609, filed on Jan. 15, 1999, now Pat. No. 6,362,826.

(51) Int. Cl.[7] ............................................. G06F 13/16

(52) U.S. Cl. ....................... 345/532; 345/536; 345/568; 711/203; 711/206

(58) Field of Search ................................ 345/503, 520, 345/531, 532, 536, 541, 545, 565, 568; 711/202, 203, 205, 206, 209, 214, 221

(56) References Cited

U.S. PATENT DOCUMENTS 4,945,499 A 7/1990 Asari et al.
5,313,577 A 5/1994 Meinerth et al.
5,706,034 A 1/1998 Katsura et al.
5,758,177 A 5/1998 Gulick et al.
5,854,637 A 12/1998 Sturges
5,914,730 A 6/1999 Santos et al.
6,052,133 A 4/2000 Kang
6,097,402 A 8/2000 Case et al.
6,104,417 A 8/2000 Nielsen et al.
6,145,039 A 11/2000 Ajanovic et al.
6,157,398 A 12/2000 Jeddeloh
6,266,753 B1 * 7/2001 Hicok et al. ................ 711/202
6,462,745 B1 * 10/2002 Behrbaum et al. .......... 345/543
6,477,623 B2 * 11/2002 Jeddeloh ..................... 711/147

FOREIGN PATENT DOCUMENTS

EP 884 715 A1 12/1998
WO WO 95/15528 6/1995

* cited by examiner

*Primary Examiner*—Ulka J. Chauhan
(74) *Attorney, Agent, or Firm*—Blakely, Sokoloff, Taylor & Zafman LLP

(57) ABSTRACT

A method and apparatus for implementing a dynamic display memory is provided. A memory control hub suitable for interposition between a central processor and a memory includes a graphics memory control component. The graphics memory control component determines whether operands accessed by the central processor are graphics operands. If so, the graphics memory control component transforms the virtual address supplied by the central processor to a system address suitable for use in locating the graphics operand in the memory. In one embodiment, the graphics control component maintains a graphics translation table in the memory and utilizes the graphics translation table in transforming virtual addresses to system addresses. Furthermore, in one embodiment, the graphics control component reorders the addresses of the graphics operands to optimize for performance memory accesses by a graphics device.

19 Claims, 8 Drawing Sheets

METHOD AND APPARATUS FOR IMPLEMENTING DYNAMIC DISPLAY MEMORY

The present patent application is a Continuation of prior application Ser. No. 09/231,609, filed Jan. 15, 1999, entitled "Method And Apparatus For Implementing Dynamic Display Memory" now U.S. Pat. No. 6,362,826.

BACKGROUND OF THE INVENTION

1. Field of the Invention

The invention relates generally to graphics chipsets and more specifically to management of graphics memory.

2. Description of the Related Art

It is generally well known to have a graphics subsystem which can control its own memory, and such subsytems are typically connected to a CPU, main memory, and other devices such as auxiliary storage devices by way of a system bus. Such a system bus would be connected to the CPU, main memory, and other devices. This allows the CPU access to everything connected to the bus. Graphics subsystems often include high speed memory only accessible through the graphics subsystem. Additionally, such subsystems often may access operands in main memory, typically over the system bus.

In such systems, a CPU will often have to perform operations on graphics operands. However, the organization of these operands will be controlled by the graphics subsystem. This requires that the CPU get the operands from the graphics subsystem. Alternatively, the CPU or an associated memory management unit (MMU) may control the organization of graphics operands, in which case the graphics subsystem must get data from the CPU or MMU in order to operate. In either case, some level of inefficiency is introduced, as one device must request data from the other device in order to perform its tasks.

In other systems, both the CPU and the graphics subsystem will control organization of the graphics operands. In these systems, while the CPU and the graphics subsystem will not need to request operands from each other, they will need to inform each other of when graphics operands are moved in memory or otherwise made inaccessible. As a result, increased overhead is introduced into every operation on a graphics operand.

FIG. 1 illustrates a prior art system. It includes Graphics Address Transformer 100 (GAT 100) connected to Graphics Device Controller 120 (GDC 120) which in turn is connected to Graphics Device 130. GAT 100 is also connected to a bus which connects it to Main Memory 160, Auxiliary Storage 170 and Memory Management Unit 150 (MMU 150). Central Processing Unit 140 (CPU 140) is connected to MMU 150 and thereby accesses Main Memory 160 and Auxiliary Storage 170. CPU 140 also has a control connection to GAT 100 which allows CPU 140 to control GAT 100. Main Memory 160 includes Segment Buffer 110.

CPU 140 operates on graphics operands stored in Main Memory 160 and Auxiliary Storage 170. To facilitate this, MMU 150 manages Main Memory 160 and Auxiliary Storage 170, maintaining records of where various operands are stored. When operands are moved within memory, MMU 150 updates its records of the operands' locations. GDC 120 also operates on graphics operands stored in Main Memory 160 and Auxiliary Storage 170. To facilitate this, GAT 100 maintains records of where graphics operands are stored and updates these records when operands are moved within memory. As a result, whenever CPU 140 or GDC 120 perform an action that results in movement of graphics operands, the records of both MMU 150 and GAT 100 must be updated. Maintaining coherency between the records of MMU 150 and GAT 100 requires highly synchronized operations, as many errors can be encountered in accessing either Main Memory 160 or Auxiliary Storage 110.

For example, CPU 140 may move a segment of memory from Auxiliary Storage 170 to Segment Buffer 110 of Main Memory 140, thereby overwriting the former contents of Segment Buffer 110. If such an action occurs, MMU 150 will update its records, thereby keeping track of what operands are in Segment Buffer 110, and what operands that were in Segment Buffer 110 are no longer there. If any of these operands are graphics operands, then CPU 140 must exert control over GAT 100, forcing GAT 100 to update its records concerning the various graphics operands involved. Furthermore, if GDC 120 was accessing Segment Buffer 110 when CPU 140 overwrote Segment Buffer 110, GDC 120 may now be operating on corrupted data or incorrect data.

SUMMARY OF THE INVENTION

The present invention is a method and apparatus for implementing dynamic display memory. One embodiment of the present invention is a memory control hub suitable for interposition between a central processing unit and a memory. The memory control hub comprises a graphics memory control component and a memory control component.

BRIEF DESCRIPTION OF THE DRAWINGS

The present invention is illustrated by way of example and not limitation in the accompanying figures.

DETAILED DESCRIPTION

The present invention allows for improved processing of graphics operands and elimination of overhead processing in any system utilizing graphics data. A method and apparatus for implementing dynamic display memory is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
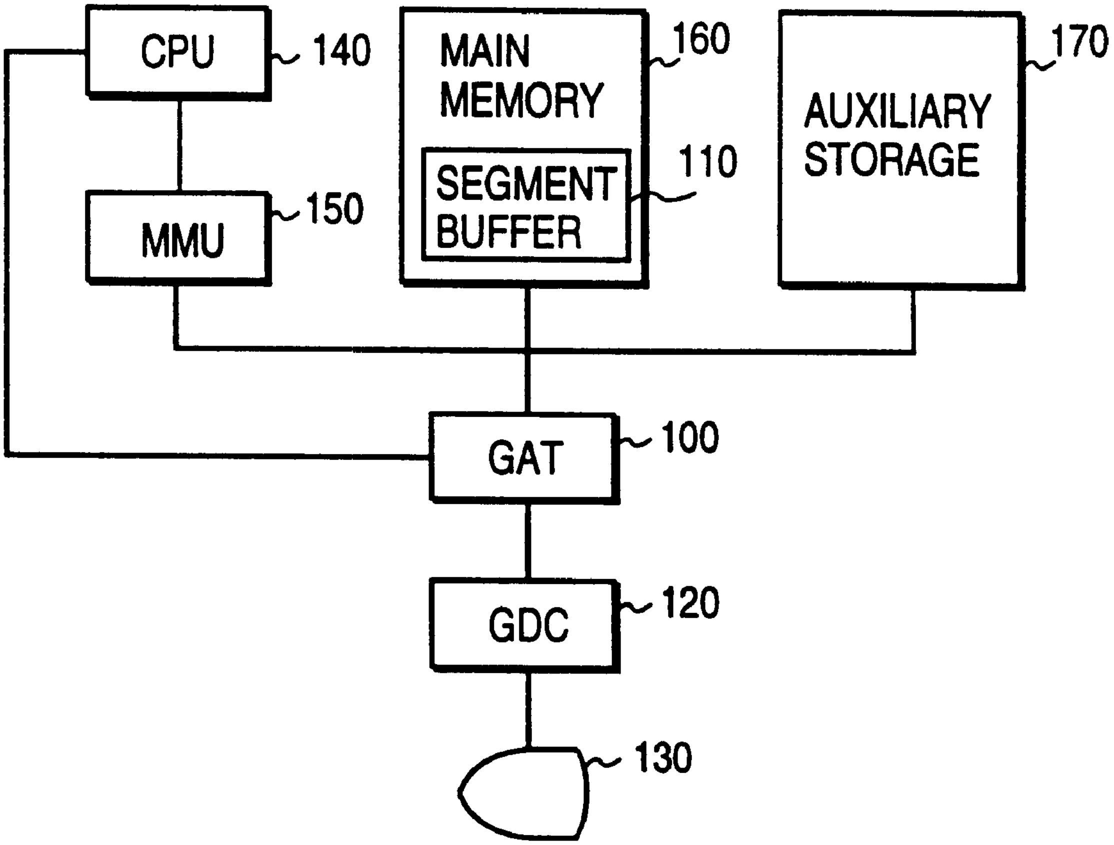
FIG. 1 (PRIOR ART)
FIG. 1 is a prior art graphics display system.
Figure 2:
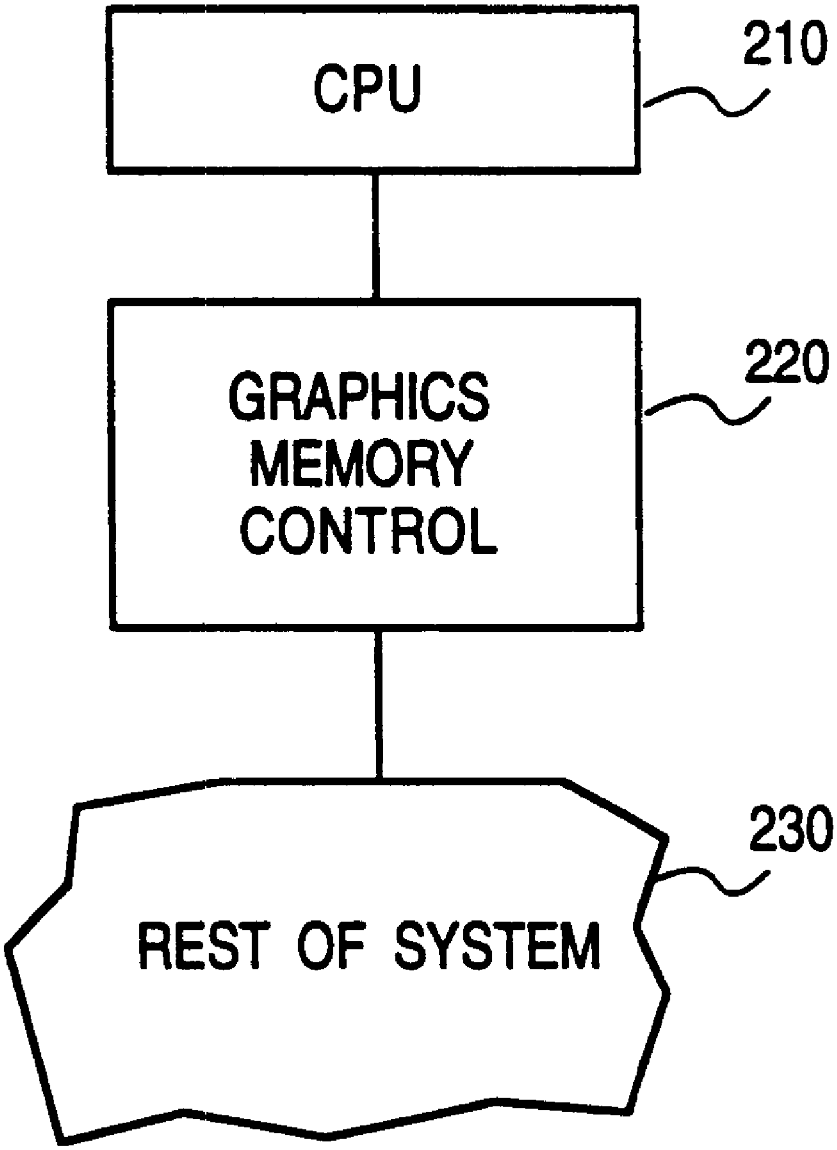
FIG. 2 illustrates one embodiment of a system.

FIG. 2 illustrates one embodiment of a system. CPU 210 is a central processing unit and is well known in the art.

Graphics Memory Control 220 is coupled to CPU 210 and to the Rest of the system 230. Graphics Memory Control 220 embodies logic sufficient to track the location of graphics operands in memory located in Rest of system 230 and to convert virtual addresses of graphics operands from CPU 210 into system addresses suitable for use by Rest of system 230. Thus, when CPU 210 accesses an operand, Graphics Memory Control 220 determines whether the operand in question is a graphics operand. If it is, Graphics Memory Control 220 determines what system memory address corresponds to the virtual address presented by CPU 210. Graphics Memory Control 220 then accesses the operand in question within Rest of system 230 utilizing the appropriate system address and completes the access for CPU 210.

If the operand is determined not to be a graphics operand, then Graphics Memory Control 220 allows Rest of system 230 to respond appropriately to the memory access by CPU 210. Such a response would be well known in the art, and includes but is not limited to completing the memory access, signaling an error, or transforming the virtual address to a corresponding physical address and thereby accessing the operand. CPU accesses to memory would include read and write accesses, and completion of such accesses typically includes either writing the operand to the appropriate location or reading the operand from the appropriate location.

Figure 3:
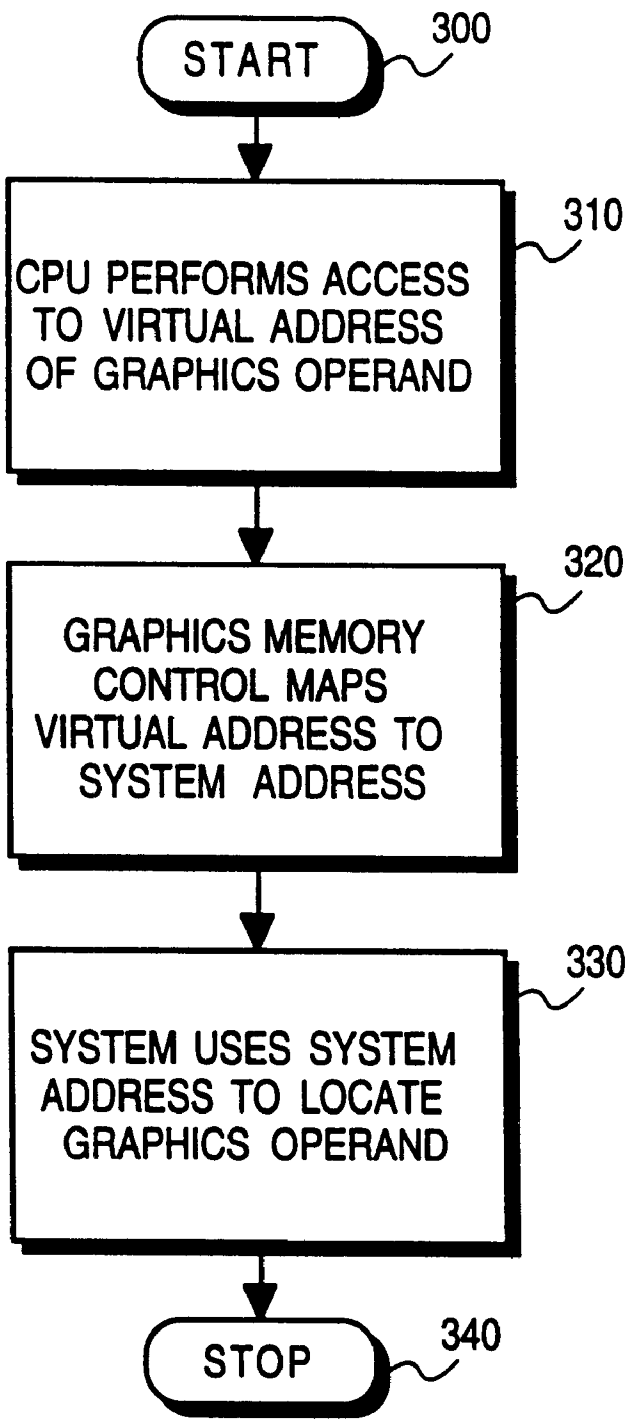
FIG. 3 is a flowchart illustrating a possible mode of operation of a system.

The apparatus of FIG. 2 can be further understood by reference to FIG. 3. The process of FIG. 3 begins with Initiation step 300 and proceeds to CPU Access step 310. CPU Access step 310 involves CPU 210 accessing a graphics operand by performing a memory access to a location based on its virtual address. The process proceeds to Graphics Mapping step 320, where Graphics Memory Control 220 maps or otherwise transforms the virtual address supplied by CPU 210 to a system address or other address suitable for use within Rest of system 230. The process then proceeds to System Access step 330 where Rest of system 230 performs the appropriate memory access using the system address to locate the graphics operand, and the process terminates with Termination step 340.

As will be apparent to one skilled in the art, the block diagram of FIG. 2 could represent CPU 210 and Graphics Memory Control 220 as separate components. However, it could also represent CPU 210 and Graphics Memory Control 220 as parts of a single integrated circuit.

Figure 4:
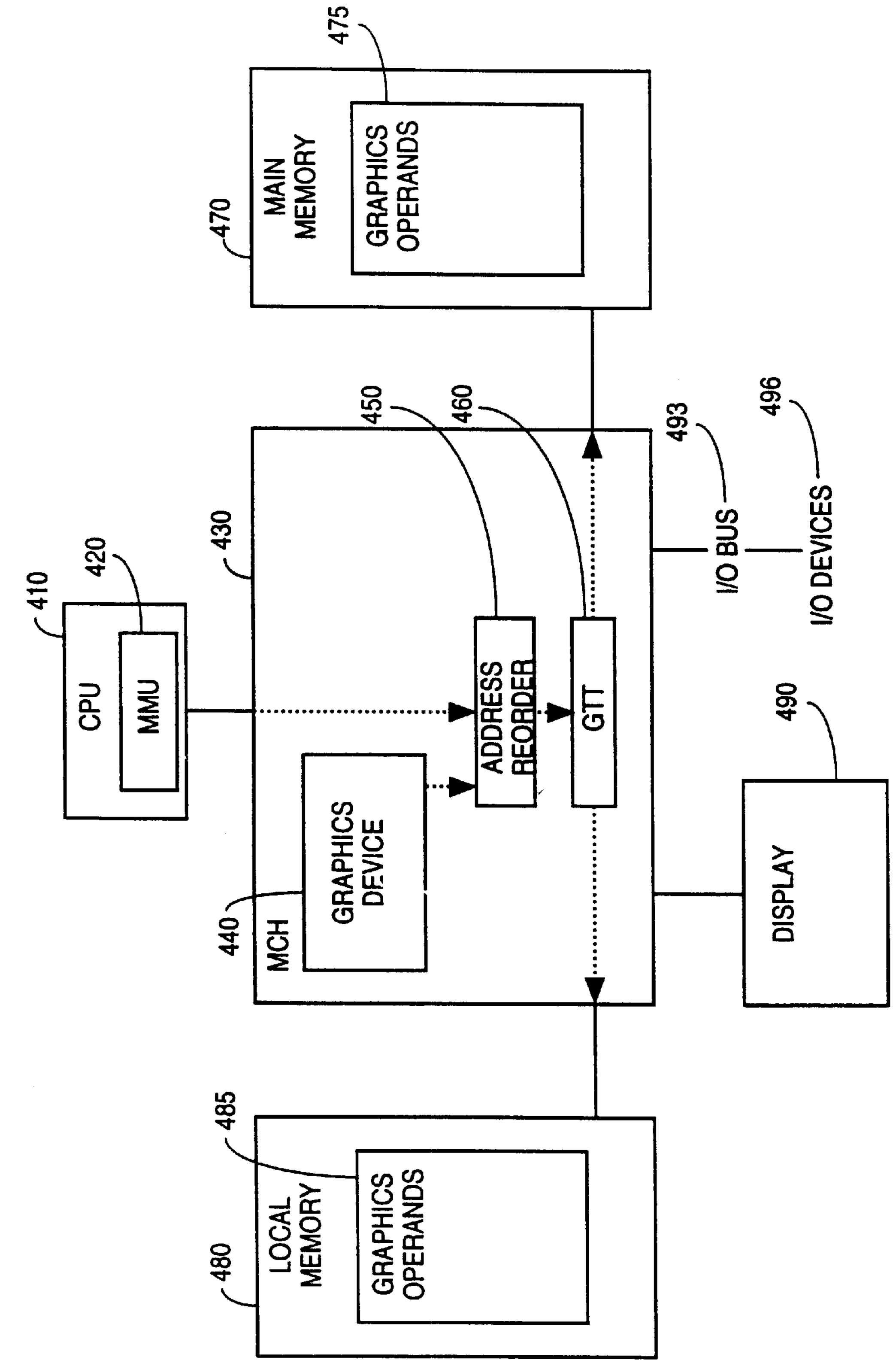
FIG. 4 illustrates another embodiment of a system.

Turning to FIG. 4, a more detailed alternative embodiment of a system is illustrated. In FIG. 4, CPU 410 contains MMU 420 and is coupled to MCH 430. MCH 430 contains Graphics Device 440, Address Reorder Stage 450 and GTT 460 (a Graphics Translation Table). MCH 430 is coupled to Local Memory 480, Main Memory 470, Display 490, and I/O Devices 496. Local Memory 480 contains Graphics Operands 485, and Main Memory 470 contains Graphics Operands 475. MCH 430 is coupled through I/O Bus 493 to I/O Devices 496. Both Graphics Device 440 and CPU 410 have access to Address Reorder Stage 450. In one embodiment, for coherency reasons, only CPU 410 can modify GTT 460, so only CPU 410 can change the location in memory of graphics operands.

Figure 5:
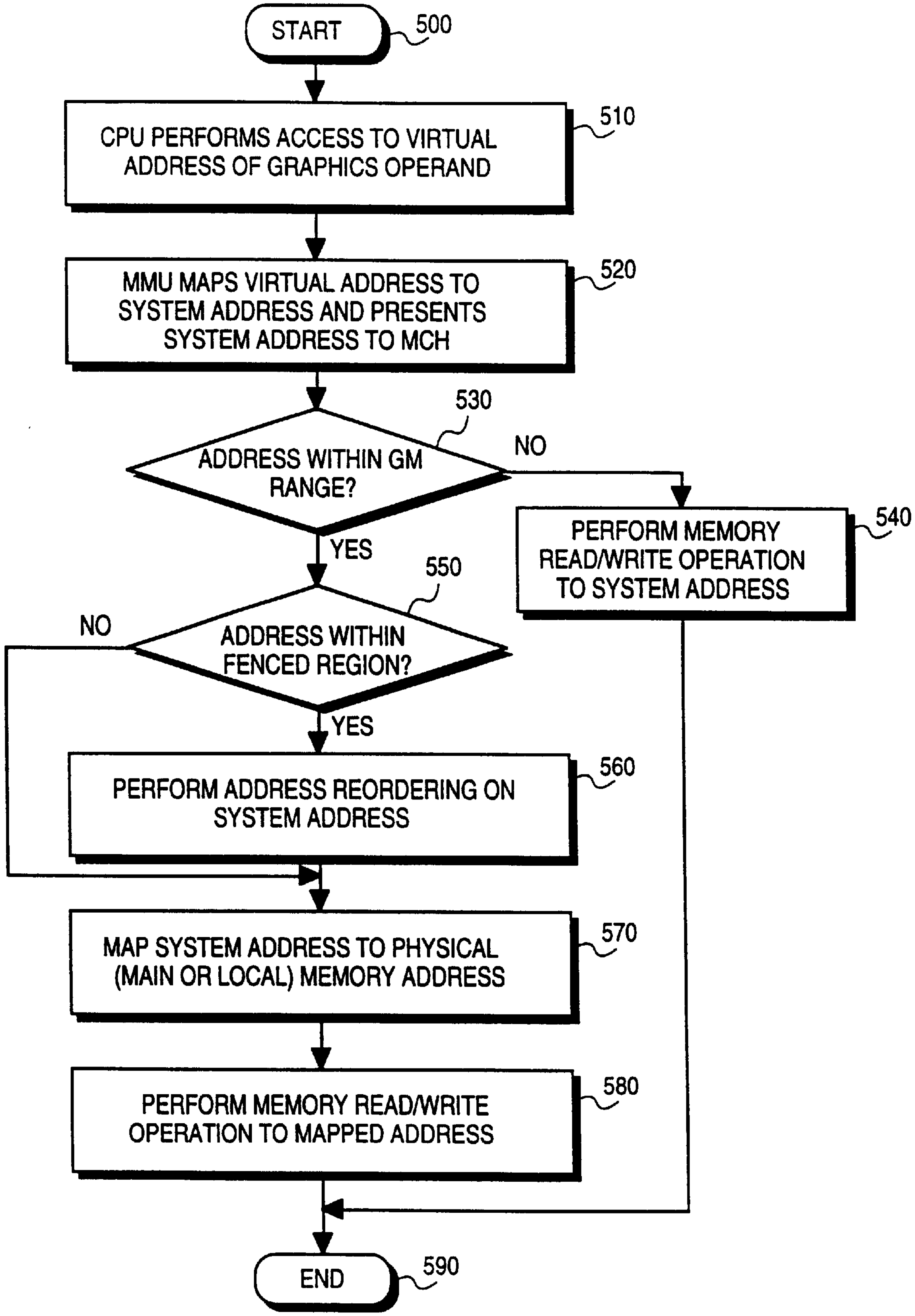
FIG. 5 is a flowchart illustrating a possible mode of operation of a system.

Operation of the system of FIG. 4 can be better understood with reference to the method of operation illustrated in FIG. 5. CPU Access step 510 represents CPU 410 performing an access to the virtual address of a graphics operand. MMU processing step 520 represents MMU 420 mapping or otherwise transforming the virtual address supplied by CPU 410 to a system address suitable for use in accessing memory outside of CPU 410. Note that if the graphics operand accessed by CPU 410 were contained in a cache within CPU 410 then MMU 420 might not have accessed memory outside of CPU 410. However, most graphics operands will be uncacheable, so the memory access will go outside the CPU.

At determination step 530, MCH 430 checks whether the system address from MMU 420 is within the Graphics Memory range. The Graphics Memory range is the range of addresses that is mapped by GTT 460 for use by Graphics Device 440. If the system address is not within the Graphics Memory range, the process proceeds to Access step 540 where MCH 430 performs the memory access at the system address in a normal fashion. Typically this would entail some sort of address translation, determination of whether the address led to a particular memory device, and an access of that particular device.

If the system address is within the Graphics Memory range, the process proceeds to determination step 550, where the Address Reorder Stage 450 determines whether the address is within a fenced region. One embodiment of Address Reorder Stage 450 includes fence registers which contain information delimiting certain portions of the memory assigned for use by Address Reorder Stage 450 as fenced regions. These fenced regions may be organized in a different manner from other memory or otherwise vary in some way from the rest of system memory. In one embodiment, the contents of the fenced region may be tiled or otherwise reorganized, meaning that memory as associated with graphics operands may be ordered to form tiles that mimic logically a spatial form such as a rectangle, square, solid, or other shape. If the system address is determined to be within a fenced region, appropriate reordering of the system address is performed at Reordering step 560. Such reordering typically involves some simple mathematical recalculation and may also be performed through use of a lookup table.

After Reordering step 560, the reordered address is mapped to a physical address at Mapping step 570. Likewise, if no reordering was necessary, the system address as supplied by MMU 420 is mapped to a physical address at Mapping step 570. This mapping step typically involves use of a translation table, in this case GTT 460 the Graphics Translation Table, which contains entries indicating what addresses or ranges of system addresses correspond to particular locations in main or local memory. Similar translation tables would be used by MCH 430 in performing the memory access of Access step 540. Finally, the translated address is used to perform an access at Access step 580 in a fashion similar to that of Access step 540. The process terminates with Termination step 590.

Figure 6:
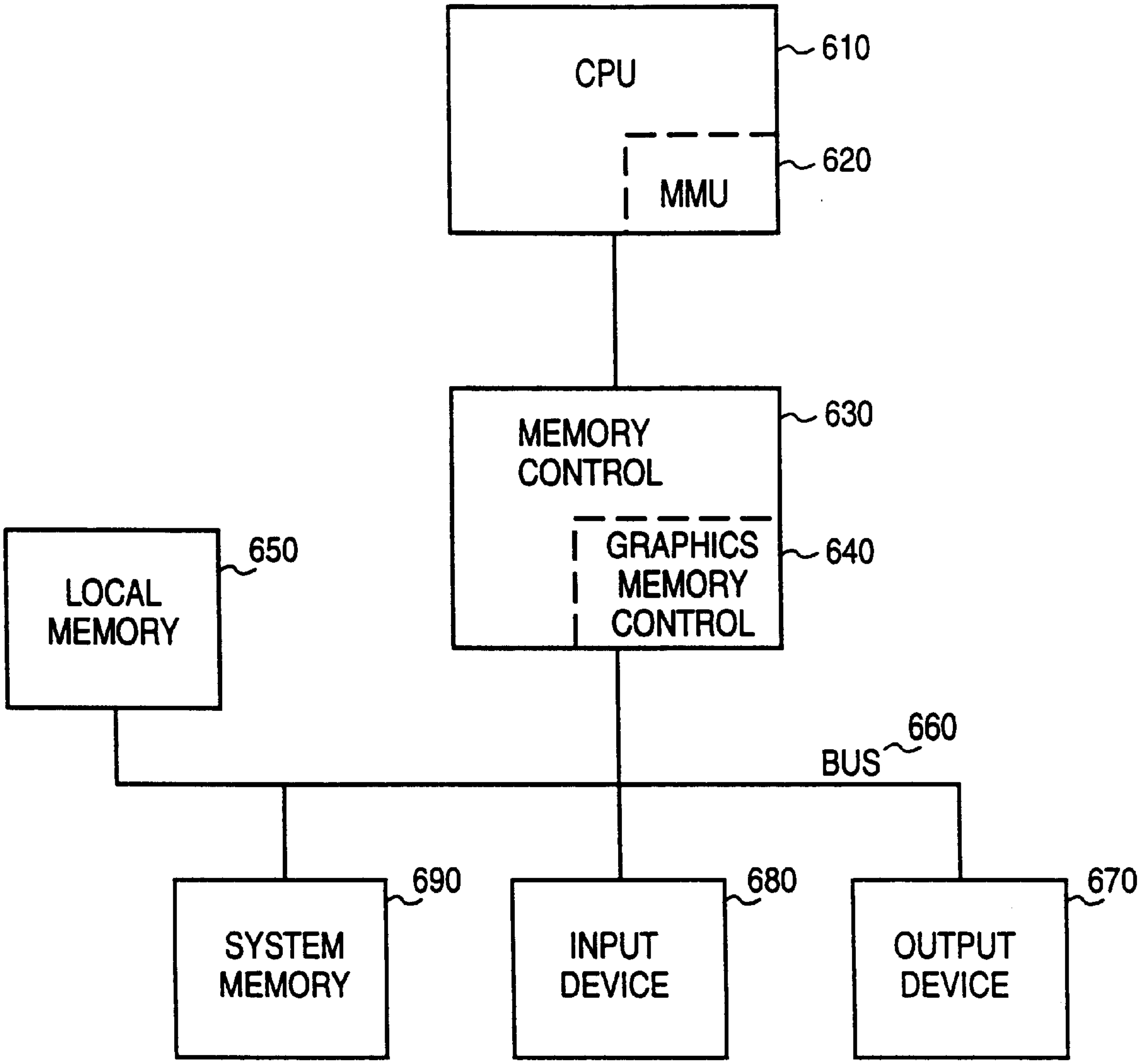
FIG. 6 illustrates an alternative embodiment of a system.

FIG. 6 illustrates yet another embodiment of a system. CPU 610 includes MMU 620 and is coupled to Memory Control 630. Memory Control 630 includes Graphics Memory Control 640 and is coupled to Bus 660. Also coupled to Bus 660 are Local Memory 650, System Memory 690, Input Device 680 and Output Device 670. After CPU 610 requests access to an operand, Memory Control 630 can translate the address supplied by CPU 610 and access the operand on Bus 660 in any of the other components coupled to Bus 660. If the operand is a graphics operand, Graphics Memory Control 640 appropriately manipulates and transforms the address supplied by CPU 610 to perform the same kind of access as that described for Memory Control 630.

Figure 8:
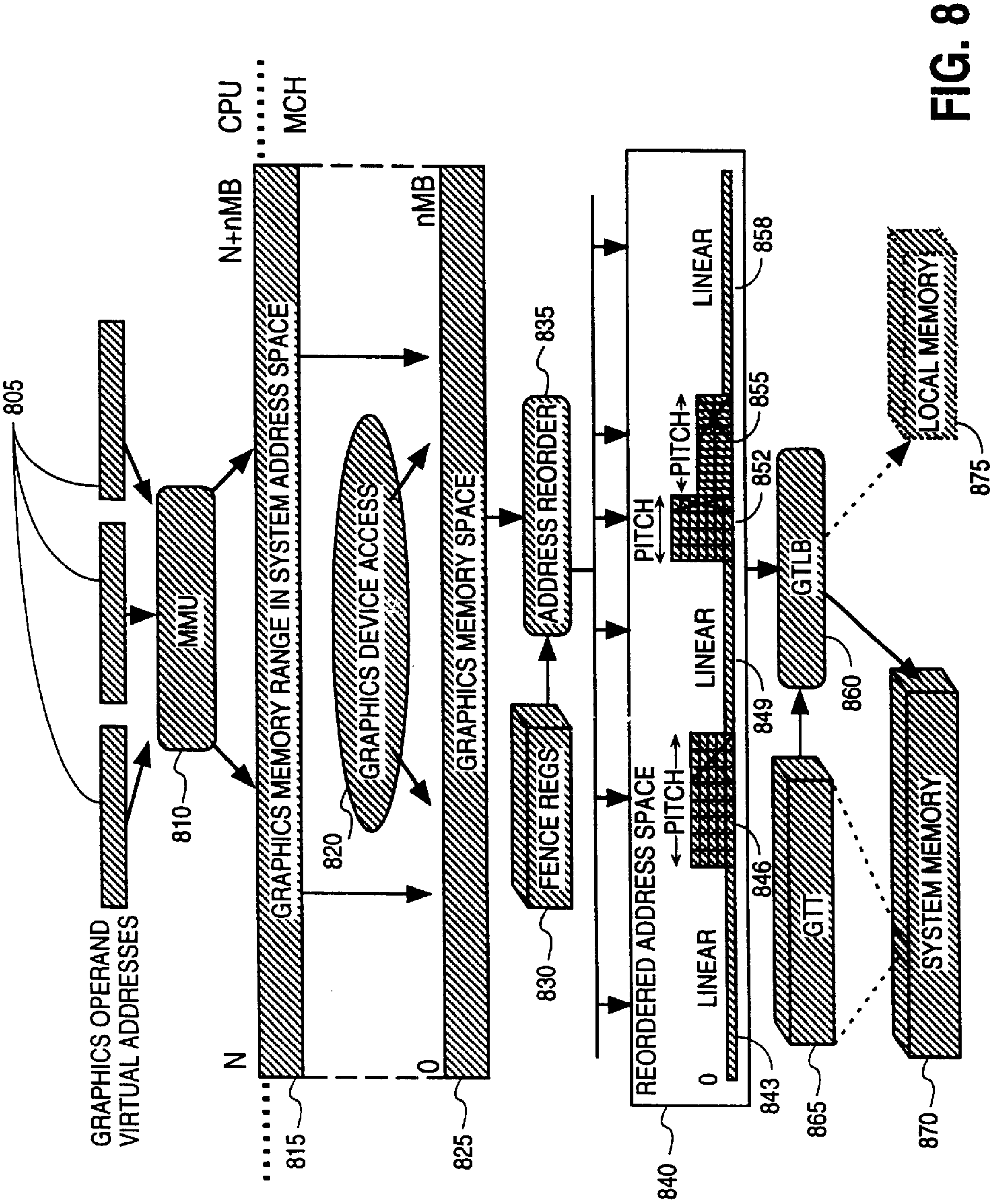
FIG. 8 illustrates memory access within a system.

FIG. 8 illustrates another embodiment of a system and how a graphics operand is accessed. Graphics Operand Virtual Addresses 805 are the addresses seen by programs executing on a CPU. MMU 810 is the internal memory management unit of the CPU. In one embodiment, it transforms virtual addresses to system addresses through use of a lookup table containing entries indicating which virtual addresses correspond to which system addresses. Memory Range 815 is the structure of memory mapped to by MMU 810, and each system address for a graphics operand which MMU 810 produces addresses some part of this memory space. The portion shown is the graphics memory accessible to the CPU in one embodiment, and other portions of the memory range would correspond to devices such as input or other output devices.

Graphics Memory Space 825 is the structure of graphics memory as seen by a graphics device. Graphics Device Access 820 shows that in one embodiment, the graphics device accesses the memory without the offset N used by the CPU and MMU 810 in accessing the graphics memory space as the graphics device does not have access to the rest of the memory accessible to the CPU. Both Memory Range 815 and Memory Space 825 are linear in nature, as this is the structure necessary for programs operating on a CPU and for access by the graphics device (in one embodiment they are 64 MB in size).

When Graphics Device Access 820 presents an address, or the MMU 810 presents a system address for access to memory, Address Reorder stage 835 operates on that address. Address Reorder stage 835 determines whether the address presented is within one of the fenced regions by checking it against the contents of Fence Registers 830. If the address is within a fenced region, Address Reorder stage 835 then transforms the address based on other information in Fence Registers 830 which specifies how memory in Reordered Address Space 840 is organized. Reordered Address Space 840 can have memory organized in different manners to optimize transfer rates between memory and the CPU or the graphics device. Two manners of organization are linear organization and tiled organization. Linearly organized address spaces such as Linear space 843, 849, and 858 all have addresses that each come one after another in memory from the point of view of Address Reorder Stage 835.

Figure 7:
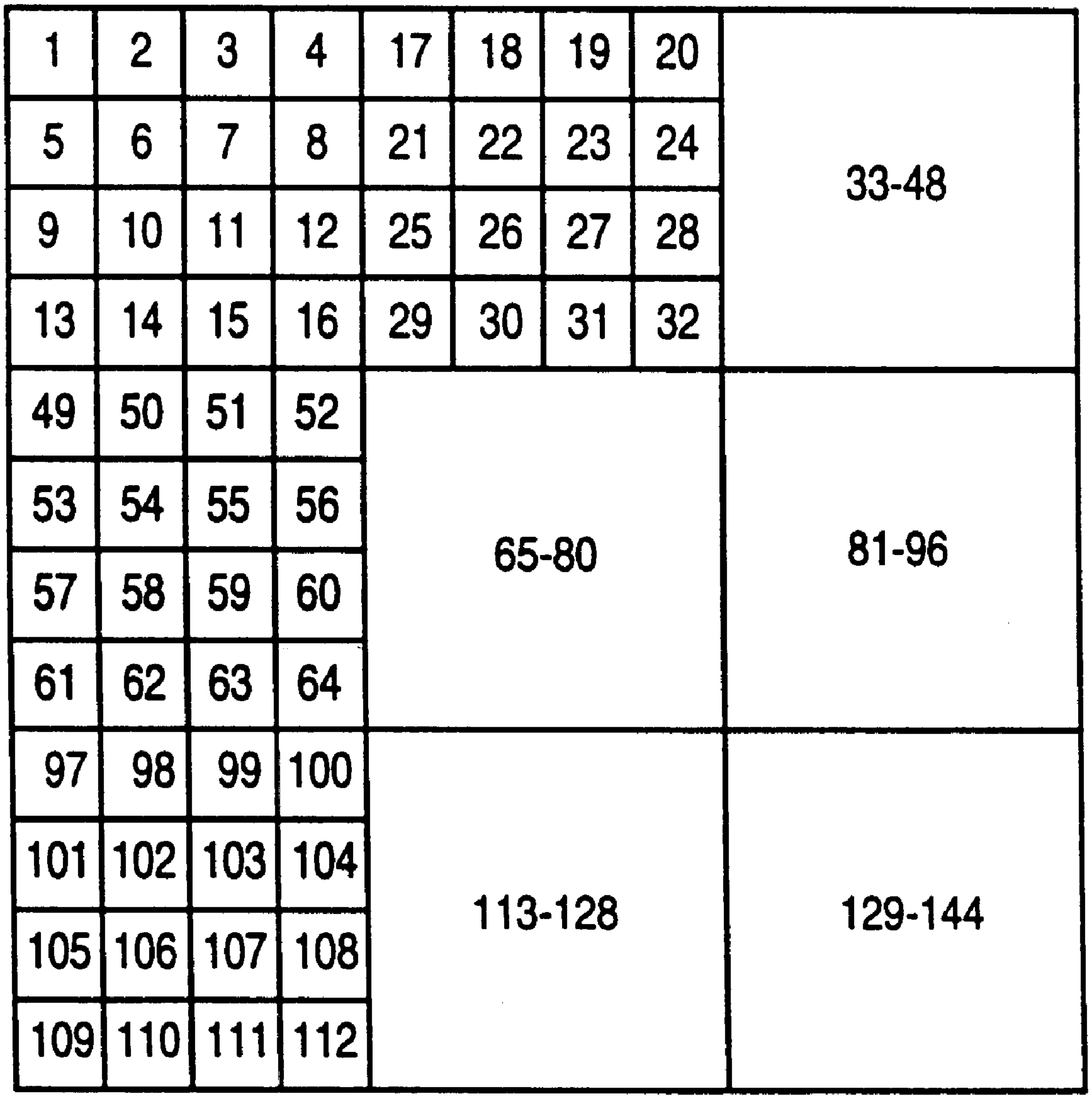
FIG. 7 illustrates a tiled memory.

Tiled addresses, such as those in Tiled spaces 846, 852, and 855, would be arranged in a manner as shown in FIG. 7, where each tile has addresses counting across locations within the tile row by row, and the overall structure has each address in a given tile before all addresses in the next tile and after all addresses in the previous tile. In one embodiment, tiles are restricted to 2 kB in size and tiled spaces must have a width (measured in tiles) that is a power of two. The pitch referred to in Tiled spaces 846, 852, and 855 is the width of the Tiled spaces. However, not all addresses within a tile need to correspond to an actual operand, so the addresses in Tiled spaces 846, 852, and 855 that are marked by an X need not correspond to actual operands. Additionally, such unneeded tiles may also correspond to a scratch memory page. As will be apparent to one skilled in the art, tiles could be designed with other sizes, shapes and constraints, and addresses within tiles could be ordered in ways other than that depicted in FIG. 7.

Tiled spaces can be useful because they may be shaped and sized for optimum or near-optimum utilization of system resources in transferring graphics operands between memory and either the graphics device or the CPU. Their shapes would then be designed to correspond to graphics objects or surfaces. Understandably, tiled spaces may be allocated and deallocated dynamically during operation of the system. Ordering of addresses within tiled spaces may be done in a variety of ways, including the row-major (X-axis) order of FIG. 7, but also including column-major (Y-axis) order and other ordering methods.

Returning to FIG. 8, accesses to addresses in Reordered Address Space 840 go through GTLB 860 (Graphics Translation Lookaside Buffer) in concert with GTT 865 (Graphics Translation Table). GTT 865 itself is typically stored in System Memory 870 in one embodiment, and need not be stored within a portion of System Memory 870 allocated to addresses within Graphics Memory Space 825. GTLB 860 and GTT 865 take the form of lookup tables associating a set of addresses with a set of locations in System Memory 870 or Local Memory 875 in one embodiment. As is well known in the art, a TLB or Translation Table may be implemented in a variety of ways. However, GTLB 860 and GTT 865 differ from other TLBs and Translation Tables because they are dedicated to use by the graphics device and can only be used to associate addresses for graphics operands with memory. This constraint is not imposed by the components of GTLB 860 or GTT 865, rather it is imposed by the system design encompassing GTLB 860 and GTT 865. GTLB 860 is profitably included in a memory control hub, and GTT 865 is accessible through that memory control hub.

System Memory 870 typically represents the random access memory of a system, but could also represent other forms of storage. Some embodiments do not include Local Memory 875. Local Memory 875 typically represents memory dedicated for use with the graphics device, and need not be present in order for the system to function.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A system comprising:

a central processor;

a first memory;

a second memory;

the first memory being a non-cache system memory, and the second memory being a graphics memory dedicated to storing graphics operands; and a memory controller coupled to the central processor and coupled to both the first memory and the second memory, the memory controller having a graphics control component and a memory control component, the graphics control component determining whether an operand accessed by the central processor is a graphics operand, if the operand is a graphics operand, the graphics control component transforming an address of the operand to an address corresponding to a location of the operand in one of the first memory of the second memory.

2. The system of claim 1 wherein:

the graphics memory control component utilizes a graphics translation table to determine where a graphics operand is located in either of the first memory or the second memory, the graphics translation table comprising a set of entries, each entry associating a virtual address with a system address, the virtual address utilized by the central processor, the system address utilized by one of the first memory and the second memory, the central processor able to modify the graphics translation table.

3. The system of claim 2 wherein:

the graphics translation table stored in the first memory.

4. The system of claim 2 wherein:

the graphics translation table is stored in one of the first memory or the second memory.

5. The system of claim 4 wherein:

the graphics memory control component maintains a set of fence registers, the set of fence registers to store information defining organization of locations of graphics operands in either of the first memory or the second memory; and the graphics memory control component comprising an address reorder stage, the address reorder stage utilizing the set of fence registers to determine what system address corresponds to the virtual address of a graphics operand.

6. The system of claim 1 wherein:

the graphics memory control component to transform a virtual address of a graphics operand from the central processor to a system address, the system address corresponding to a location of the graphics operand in one of the first memory or the second memory.

7. The system of claim 1 wherein:

the graphics translation table is stored in one of the first memory or the second memory.

8. The system of claim 7 wherein:

the graphics memory control component maintains a set of fence registers, the set of fence registers to store information defining organization of locations of graphics operands in either of the first memory or the second memory; and the graphics memory control component comprising an address reorder stage, the address reorder stage utilizing the set of fence registers to determine what system address corresponds to the virtual address of a graphics operand.

9. The system of claim 7 wherein:

the graphics memory control component including means for defining organization of locations, the means for defining organization of locations determining where graphics operands are stored in either the first memory or the second memory; and the graphics memory control component comprising a means for adjusting addresses, the means for adjusting addresses determining what system address corresponds to what virtual address in conjunction with the means for defining.

10. A memory control hub suitable for interposition between a central processor, a first memory and a second memory, the memory control hub comprising:

a graphics memory management component to access graphics operands within the first memory and within the second memory;

a memory management component to access operands within the first memory; and wherein the graphics memory control component utilizes a graphics translation table to determine where a graphics operand is located in either of the first memory or the second memory, the graphics translation table comprising a set of entries, each entry associating a virtual address with a system address, the virtual address utilized by the central processor, the system address utilized by one of the first memory and the second memory.

11. The memory control hub of claim 10, wherein:

the central processor able to modify the entries in the graphics translation table.

12. The memory control hub of claim 11, further comprising:

an address reordering stage; and a set of fence registers, the graphics memory management component utilizing the set of fence registers to maintain information describing organization of graphics operands.

13. The memory control hub of claim 11, wherein the first memory is non-cache system memory, and wherein the second memory is graphics memory dedicated to storing graphics operands.

14. The memory control hub of claim 10, further comprising:

an address reordering stage; and a set of fence registers, the graphics memory management component utilizing the set of fence registers to maintain information describing organization of graphics operands.

15. The memory control hub of claim 10, wherein the first memory is non-cache system memory, and wherein the second memory is graphics memory dedicated to storing graphics operands.

16. A system comprising:

a central processor;

a first memory;

a second memory;

a graphics device;

a memory control hub coupled to the central processors, to the graphics device, and to the second memory, the memory control hub having a graphics memory control component to access operands within the first memory and within the second memory, and the memory control hub having a memory control component to access operands within the first memory; and wherein the graphics memory control component to transform a virtual address of a graphics operand from the central processor to a system address, the system address corresponding to a location of the graphics operand in one of the first memory or the second memory.

17. The system of claim 16, wherein the memory control hub further comprises:

an address reordering stage; and a set of fence registers, the graphics memory management component utilizing the set of fence registers to maintain information describing organization of graphics operands.

18. The system of claim 17 wherein the first memory is non-cache system memory, and wherein the second memory is graphics memory dedicated to storing graphics operands.

19. The system of claim 16, wherein the first memory is non-cache system memory, and wherein the second memory is graphics memory dedicated to storing graphics operand.

* * * * *